United States Patent [19]

Fischer et al.

[11] 4,366,381

[45] Dec. 28, 1982

[54] ELECTROTHERMOGRAPHIC APPARATUS FOR DETECTION AND PINPOINTING OF MALIGNANCIES IN HUMAN BODIES

[75] Inventors: Günter Fischer, Bergisch-Gladbach; Otto Stemme, Munich; Eduard Wagensonner, Aschheim, all of Fed. Rep. of Germany

[73] Assignee: Agfa-Gevaert Aktiengesellschaft, Leverkusen, Fed. Rep. of Germany

[21] Appl. No.: 216,361

[22] Filed: Dec. 15, 1980

[30] Foreign Application Priority Data

Dec. 14, 1979 [DE] Fed. Rep. of Germany ....... 2950317

[51] Int. Cl.$^3$ .............................................. G03C 5/16
[52] U.S. Cl. .................................. 250/316.1; 250/332
[58] Field of Search .................. 250/316.1, 332, 334; 358/113

[56] References Cited

U.S. PATENT DOCUMENTS

| 3,591,713 | 12/1967 | Olsson et al. | 358/113 |
| 3,635,085 | 1/1972 | Shimotsuma et al. | 358/113 |
| 3,798,366 | 3/1974 | Hunt et al. | 250/334 |
| 3,869,212 | 3/1975 | Burcher et al. | 250/332 |
| 4,158,137 | 6/1979 | Menke | 250/332 |
| 4,218,707 | 8/1980 | Reed et al. | 250/334 |

OTHER PUBLICATIONS

"Pyroelectric Self-Scanning IR Detector Arrays", Roundy, *Applied Optics,* 4-79, vol. 18, No. 7, pp. 943-945.

*Primary Examiner*—Bruce C. Anderson
*Attorney, Agent, or Firm*—Kontler, Grimes & Battersby

[57] ABSTRACT

Apparatus for supplying signals to a vidicon which furnishes a color image of a selected portion of the human body, especially of the mamma, has an optical scanning system which transmits a thermal image of the selected portion of the body to a pyroelectric infrared detector without touching the selected portion. The detector transmits signals denoting the temperature of different spots of the selected portion of the body to a storage whose output transmits signals to the vidicon, always via one of a series of threshold circuits which are calibrated to transmit signals to associated color matrices only when the intensity of such signals is within a range denoting the particular color. The matrices transmit signals to the vidicon so that the latter furnishes a color image of the selected portion of the body.

18 Claims, 3 Drawing Figures

4,366,381

ELECTROTHERMOGRAPHIC APPARATUS FOR DETECTION AND PINPOINTING OF MALIGNANCIES IN HUMAN BODIES

BACKGROUND OF THE INVENTION

The present invention relates to apparatus for detecting and pinpointing localized changes in body temperature. More particularly, the invention relates to electrothermographic apparatus for detection and pinpointing or displaying of tumors, especially cancerous tumors in female breasts. Still more particularly, the invention relates to improvements in apparatus for monitoring selected portions of human bodies and for evaluating thermal radiation signals which are generated in the course of the monitoring operation.

It is known that the region of a malignancy in a human body develops temperatures exceeding those of the neighboring healthy tissue. The reason for such phenomenon is that a malignancy entails an increased localized tissue change activity which is promoted by increasing production of lymphatic and blood vessels. In the case of histologically confirmed malignant tumors, this leads to a rise of 1°-7° C. above the temperature of the neighboring or surrounding healthy tissue. In the case of benign changes of tissue, the temperature rise of the affected area is much less pronounced, normally less than 1° C. As explained above, the number of blood vessels in a malignant tumor is greatly increased, i.e., the circulation of blood is much greater than in a healthy tissue with attendant rise of temperature of the affected portion of the body or an organ. The rise in temperature can be detected and localized with a reasonable degree of accuracy and sharpness.

It is also known to detect the presence or absence of malignancies in a human body by resorting to thermographic apparatus which monitor a selected portion of the body and generate signals denoting those spots or regions of the selected portion where the temperature deviates from the temperature of healthy tissue, and to utilize the results of such monitoring operation for pinpointing of actual or suspected malignancies. A presently known electrothermographic apparatus which is utilized for detection of malignant tumors comprises evaluating means in the form of a thermographic plate which contains liquid crystals. The plate records the temperature differences by changing the color or colors of one or more liquid crystals. The crystals are embedded in the plate and their color changes from red to green and thereupon to blue in response to increasing temperature. The temperature response is just the opposite (i.e., from blue to green and back to red) during cooling of the liquid crystals. It has been found that a thermographic plate can furnish reasonably sharp images of malignant and healthy areas, i.e., the outline of a malignant tumor can be seen with a relatively high degree of accuracy.

A drawback of apparatus which employ thermographic plates is that a plate must be brought into direct contact with the selected portion of the body. Therefore, the plate equalizes the temperatures of various spots or regions of the selected portion with attendant reduction of accuracy of the monitoring operation because the plate acts as a conductor of heat from warmer to cooler regions or spots. Moreover, it is not always possible to accurately conform the thermographic plate to the outline of the selected portion of a human body.

OBJECTS AND SUMMARY OF THE INVENTION

An object of the invention is to provide a novel and improved apparatus which can detect and accurately pinpoint variations of temperature in various sections, zones or spots of a selected portion of a human body and which can accurately image or otherwise indicate or pinpoint those sections, zones or spots whose temperature is within, above and/or below a predetermined range.

Another object of the invention is to provide an electrothermographic apparatus whose temperature detecting or monitoring means need not come in actual contact with the selected portion or portions of the human body.

A further object of the invention is to provide the apparatus with novel and improved means for evaluating the signals which denote the temperature of various spots, regions or zones of the selected portion of a human body.

An additional object of the invention is to provide a novel and improved apparatus for contactless scanning of female breasts or other portions of human bodies for the presence of malignant tumors or other abnormalities whose development entails or is accompanied by a rise in temperature of the affected tissue.

Another object of the invention is to provide the apparatus with novel and improved means for converting heat signals into other types of signals and for displaying the converted signals in a manner which facilitates comprehension of the displayed or otherwise recorded series of signals.

An additional object of the invention is to provide an electrothermographic apparatus whose monitoring system does not and cannot influence the temperature of various spots, regions or zones of a selected portion of the human body.

Another object of the invention is to provide an electrothermographic apparatus of the above outlined character which can furnish a readily discernible and readily decodable multicolored display of temperatures in various regions of a selected portion of a human body.

A further object of the invention is to provide a novel and improved electronic evaluating system which receives signals from the temperature monitoring system, and to provide means which can furnish a multicolored visual display of the results of the electronic evaluating operation.

The invention resides in the provision of an electrothermographic apparatus for detection and pinpointing (e.g., color imaging) of tumors in objects forming part of human bodies, especially of cancerous growths in the mamma. As explained above, the temperature of tissue in a cancerous part of the mamma is higher than the temperature of the adjacent or surrounding healthy tissue. The apparatus comprises pyroelectric detector means, preferably pyroelectric infrared detector means with a multi-row or single row array of detector elements, and means for optically transmitting a thermal image of the object which is to be examined to the detector means which latter is operative to generate signals having intensities denoting the temperature of discrete spots of the object. A memory or other suitable means is provided for storing the signals which are generated by the detector means as is a circuit arrangement or other suitable means for evaluating the stored signals according to intensity. The apparatus further comprises a vidicon tube or other suitable means for displaying the evaluated signals in different colors each of which is indicative of a given range of signal intensities.

The transmitting means may include means (preferably including a pivotable mirror) for scanning the object, line-by-line, and for transmitting to the detector means signals denoting the temperature of each of a large number of spots in each scanned line of the object. This renders it possible to produce a color image consisting of a large number of dots so that the resolution of the image is quite satisfactory. The stored signals are preferably electric voltage signals.

The infrared detector means may include a system of shift registers with a self-scanning circuit.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
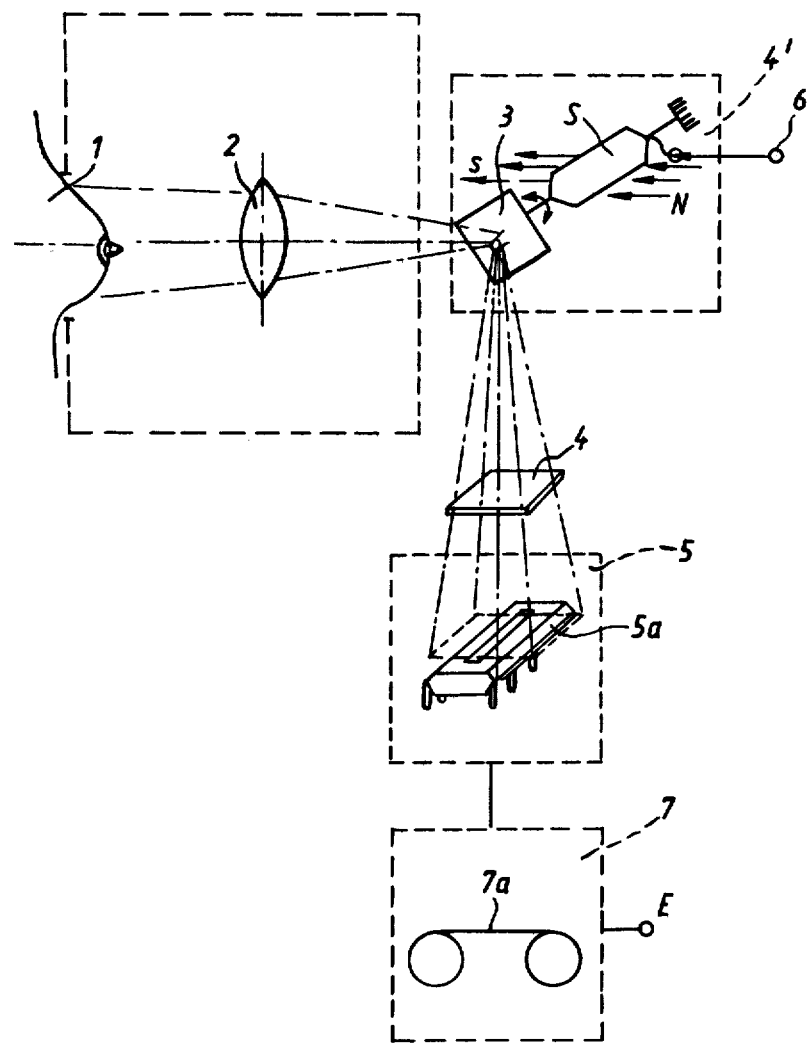
FIG. 1 is a diagrammatic view of certain constituents of an apparatus which embodies the invention.

FIG. 1 shows that the object to be examined is a mamma 1. The distribution of temperatures in different regions of the object 1 is imaged by an optical system 2, an oscillating mirror 3, an optical band pass filter 4 and a pyroelectric infrared detector 5 with a self-scanning circuit. The thermal image of the object 1 is scanned by the mirror 3, line-by-line, and each line comprises a predetermined number of image points or dots. The parts 2–4 transmit the thermal image of the object 1 to the detector 5.

The mirror 3 constitutes a component of a scanning system 4' further including an oscillatable loop or coil S of the type known from the field of galvanometers. The terminal 6 receives impulses for operation of the system 4' so that the mirror 3 images the object 1, line-by-line, onto the detector 5 via band pass filter 4. The purpose of the filter 4 is to ensure that thermal radiation of the object 1 can be evaluated without interference from other sources of thermal radiation. To this end, the optical band pass filter 4 is designed to transmit signals solely within a range corresponding to that of the radiation frequencies of a human body.

The pyroelectric detector 5 evaluates a radiation spectrum of between 1 μm and approximately 50 μm. The mode of evaluation is analogous to that in a so-called CCD (charge coupled device) line. Reference may be had to the article by Carlos B. Roundy entitled "Pyroelectric self-scanning infrared detector arrays" published in the Apr. 1, 1979 issued of APPLIED OPTICS (Vol. 18, No. 7). The disclosure of the corresponding U.S. Pat. No. 4,072,863 granted Feb. 7, 1978 to Roundy is incorporated herein by reference.

The reference character 7 denotes an electronic image storing unit or storage unit which includes a magnetic band 7a. Alternatively, the storing unit 7 can employ a disc or may constitute a storage unit for constant values. The unit 7 stores signals denoting discrete points of the thermal image of the object 1 in the form of analog or digital signals.

The pryroelectric infrared detector 5 includes a self-scanning circuit and a time-delay system including a shift register arrangement. The detector 5 comprises a battery of crystals; it absorbs infrared radiation and converts it into heat in the crystals. The temperature change during heating or cooling of a crystal effects the generation of a so-called displacement current between the detector electrodes. The crystals form solid-state arrays and are capable of furnishing a high-resolution image, i.e., a large number of points (pronounced point density). Further details of such detector means are disclosed in the aforementioned article by Roundy. It will be noted that the component 5a within the broken-line rectangle denoting the detector 5 in FIG. 1 corresponds to the multi-element linear pyroelectric detector array in FIG. 1a of the Roundy article.

If the detector 5 is not constructed in the just outlined manner, i.e., if it constitutes more than a mere linear array, the construction of the image transmitting means between the object 1 and the detector 5 can be simplified by omitting the means for pivoting the mirror 3 so as to effect line-by-line scanning of the object. If the mirror 3 is pivoted, the detector 5 comprises a line or row of elements as shown in FIG. 1. The pivotable mirror images each line of the image of the object 1 onto the row of elements in the component 5a of the detector 5.

Figure 1A:
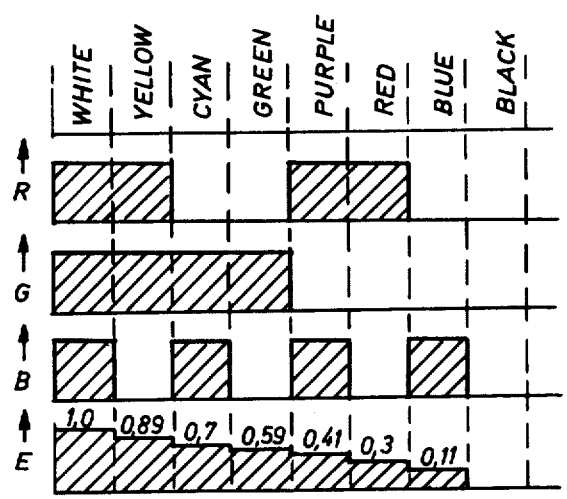
FIG. 1a is a diagram showing the relationship between color values and the intensities of standardized voltage signals denoting various colors.

FIG. 1a illustrates the composition of white, yellow, cyan, purple and black colors in a manner known from the field of color television. Thus, white light is composed of red, green and blue light having identical intensities. Yellow light is composed of red and green light, cyan colored light is composed of green and blue light, purple of red and blue, and black does not contain any of the basic colors red, green and blue. As is further known from the field of television, owing to spectral sensitivity of the human eye, the light density signal Y equals the sum of the red color value signal multiplied by the relative brightness correction factor 0.30, the green color value signal multiplied by the relative brightness correction factor 0.59 and the blue color value signal multiplied by the relative brightness correction factor 0.11. Thus, the brightness of the light density signal Y for white equals one; for yellow the signal equals 0.89; for cyan the signal Y equals 0.70; for green the signal Y equals 0.59; for purple the signal Y equals 0.41; for red it equals 0.30; for blue it equals 0.11; and for black the signal Y equals zero. In the illustrated embodiment, the brightness or color density signal is utilized as a color coding or identifying signal and is denoted by the character E (see also FIGS. 1 and 2). Such signal is a voltage signal and appears at the output of the storing unit 7. The amplitude of the voltage signal E is characteristic of the corresponding color value. FIG. 1a shows that the intensity of the signal E denotes the corresponding color value, i.e., if the intensity is less than 0.11, the signal E denotes a black spot; the spot or point is blue if the intensity of the signal E exceeds 0.11 but is less than 0.30 and so forth.

Figure 2:
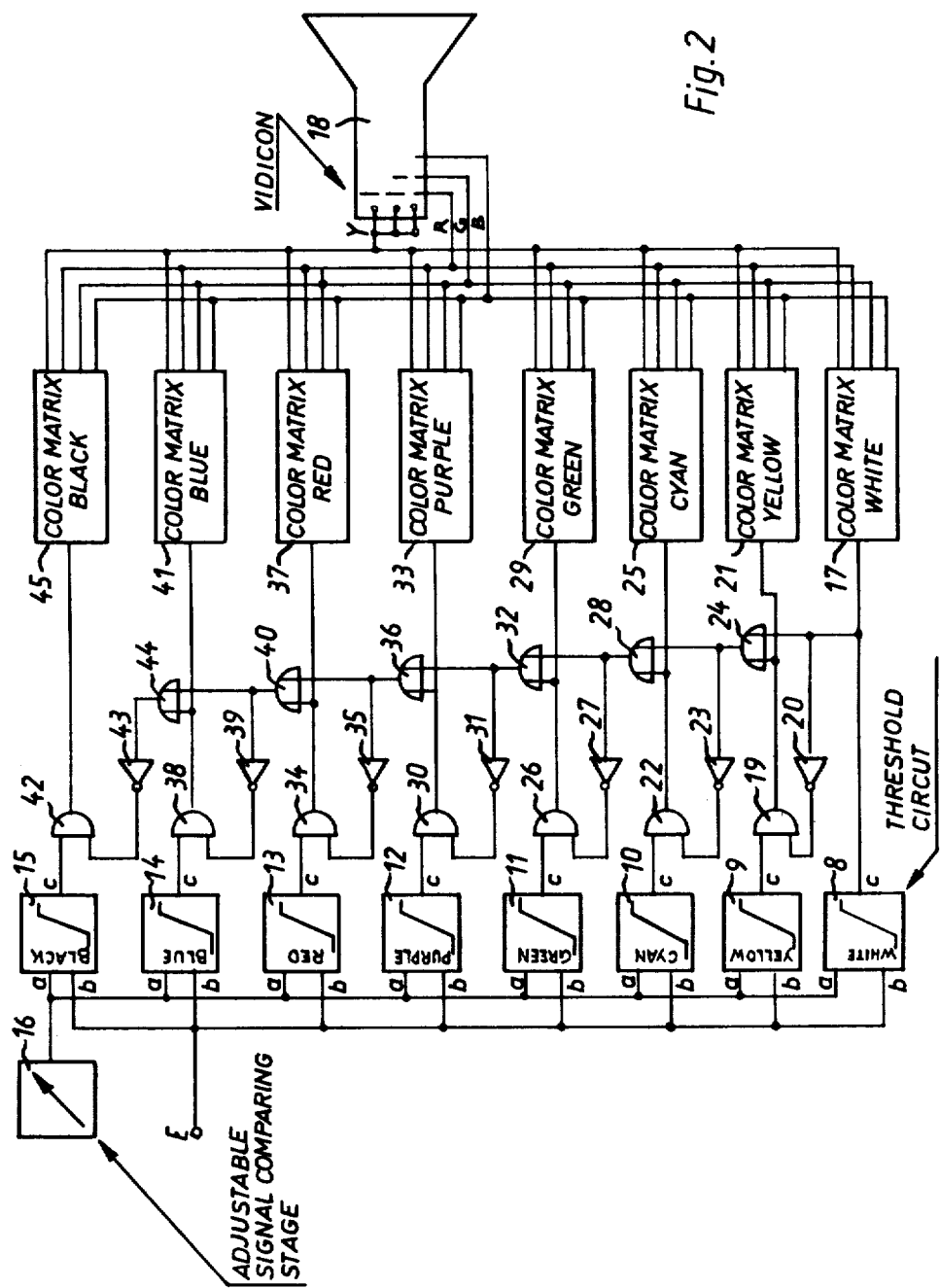
FIG. 2 is a diagrammatic view of the evaluating circuitry which is interposed between a signal storing unit and a vidicon tube.

The circuit arrangement of FIG. 2 serves to evaluate and convert the voltage signals E into a color image of the thermal image of the object 1. This circuit arrangement comprises a discrete threshold circuit 8, 9, 10, 11, 12, 13, 14, 15 for each of the corresponding colors white, yellow, cyan, green, purple, red, blue and black. The threshold value of the circuit 8 for white is exceeded only by the standardized voltage E=1.0. The threshold circuit 9 for yellow transmits a signal when the intensity of the voltage signal E exceeds 0.89. The threshold values of the circuits 10, 11, 12, 13, 14 and 15 are exceeded when the intensity of the voltage signal E respectively exceeds 0.7, 0.59, 0.41, 0.30, 0.11 and zero.

Each of the series of threshold circuits 8 to 15 comprises a signal comparing input a which is connected with the output of a signal comparing stage 16. The latter serves for selection of the intensity of that signal which denotes the threshold value for white. Basically, the signal comparing stage serves to take into consideration a basic temperature To according to which the circuit arrangement of FIG. 2 is set. To this end, the signal comparing stage 16 comprises a switching device (not shown). The stage 16 renders it possible to shift the color scale in dependency on the starting temperature To, i.e., the entire scale can be shifted by appropriate change of the temperature To.

The output c of the threshold circuit 8 is connected with a color matrix 17 for white color. The matrix 17 has four outputs three of which are respectively connected with the control inputs R, G, B (red, green and blue) and the fourth of which is connected with the color density input Y of the vidicon tube 18.

The output c of the threshold circuit 9 is connected with one input of an AND gate 19 the other input of which is connected with the output c of the threshold circuit 8 via inverter 20. The output of the AND gate 19 is connected with a matrix 21 for yellow. The four outputs of the matrix 21 are connected to the vidicon tube 18 (i.e., to the inputs R, G, B and Y of this tube) in the same way as described in connection with the color matrix 17.

The output c of the threshold circuit 10 is connected with one input of an AND gate 22 the other input of which is connected to the output of an OR gate 24 by way of an inverter 23. The two inputs of the OR gate are connected to the outputs of the threshold circuit 8 and AND gate 19. The output of the AND gate 22 is connected to a matrix 25 for cyan, and the four outputs of the matrix 25 are connected with the inputs R, G, B and Y of the vidicon tube 18.

The output c of the threshold circuit 11 is connected with one input of an AND gate 26 the other input of which is connected with the output of an OR gate 28 by way of an inverter 27. The two inputs of the OR gate 28 are connected to the outputs of the AND gate 22 and OR gate 24. The output of the AND gate 26 is connected to the input of a matrix 29 for the color green, and the four outputs of the matrix 29 are connected to the inputs R, G, B and Y of the vidicon tube 18. The output c of the threshold circuit 12 is connected with one input of an AND gate 30 the other input of which is connected with the output of an OR gate 32 by way of an inverter 31. The two inputs of the OR gate 32 are connected to the output of the AND gate 26 and to the output of the OR gate 28. The output of the AND gate 30 is connected with the input of a matrix 33 for purple. The four outputs of the matrix 33 are connected with the inputs R, G, B and Y of the vidicon tube 18.

The output c of the threshold circuit 13 is connected with one input of an AND gate 34 the other input of which is connected to the output of an OR gate 36 by way of an inverter 35. One input of the OR gate 36 is connected to the output of the AND gate 30, and the other input of the OR gate 36 is connected with the output of the OR gate 32. The output of the AND gate 34 is connected to the input of a matrix 17 for red. The four outputs of the matrix 37 are connected to the inputs R, G, B and Y of the vidicon tube 18.

The output c of the threshold circuit 14 is connected with one input of an AND gate 38 the other input of which is connected with the output of an OR gate 40 by way of an inverter 39. The two inputs of the OR gate 40 are respectively connected to the output of the AND gate 34 and the output of the OR gate 36. The output of the AND gate 38 is connected with a matrix 41 for blue. The four outputs of the matrix 41 are connected with the inputs R, G, B and Y of the vidicon tube 18.

The output c of the threshold circuit 15 is connected with one input of a further AND gate 42 the other input of which is connected with the output of an OR gate 44 by way of an inverter 43. The two inputs of the OR gate 44 are respectively connected with the output of the AND gate 38 and the output of the OR gate 40. The output of the AND gate 42 is connected with the input of a matrix 45 for black, and the four outputs of the matrix 45 are connected with the inputs R, G, B and Y of the vidicon tube 18.

The second inputs b of the threshold circuits 8 to 15 receive the signal E from the signal storing unit 7.

The purpose of the logic circuitry including the AND gates, OR gates and inverters of FIG. 2 is to ensure that only one of the color matrices transmits signals to the vidicon tube 18 at any stage of imaging of the object 1. As explained above, the AND gates 19, 22, etc. are interposed between the outputs of at least some of the threshold circuits 8 to 15 and the corresponding color matrices, and the OR gates 24, 28, etc. are interposed between the outputs of certain AND gates and the inputs of neighboring AND gates. The threshold circuits 8 to 15 from a series of successive circuits and the inverters 20, 23, etc. of the logic circuitry shown in FIG. 2 are interposed between the OR gates receiving signals from the preceding threshold circuits of the series and the inputs of the AND gates connected to the outputs of the next-following threshold circuits of the series.

The thermal image of the object 1 is transmitted, point-by-point and line-by-line, to the signal storing unit 7 by the optical system 2, mirror 3, band pass filter 4 and detector 5. The stage 16 is adjusted to select a desired temperature level To. The output of the storing unit 7 transmits an analog signal E to the inputs b of all eight threshold circuits 8 to 15 for each and every monitored point of the object 1. For example, if the apparatus ascertains the presence of a region whose temperature is higher than the temperature of the neighboring tissue, the output c of the threshold circuit 8 transmits a signal to the matrix 17 and the latter causes the vidicon tube 18 to image the corresponding point of the object 1 in white. If the apparatus produces a series of signals E with the standardized voltage values in the region between 0.89 and 1.00, the output c of the threshold circuit 9 transmits a signal so that the value of the voltage signal at the corresponding input of the AND gate 19 equals one. At the same time, there is no signal at the output c of the threshold circuit 8 because the value of E does not exceed one, i.e., the second input of the AND gate 19 receives a signal owing to the provision of the inverter 20. Consequently, the output of the AND gate 19 transmits a signal to the matrix 21 which causes the vidicon tube 18 to identify the corresponding point or points of the object 1 in yellow. Thus, the inverter 20 converts the potential "0" at the output c of the threshold circuit 8 into a potential "1" at the corresponding input of the AND gate 19. Two of the four outputs of the matrix 21 transmit voltage signals (value "1") to the inputs G and R of the vidicon tube 18 (refer to FIG. 1a) so that the image of the corresponding point or dot of the object 1 is denoted in yellow.

If another point or region of the object 1 exhibits a temperature which causes the storage unit 7 to transmit a voltage signal E having an intensity between 0.41 and 0.58 (purple), the output c of the threshold circuit 12 transmits a signal (potential "1") to the corresponding input of the AND gate 30. The outputs c of the threshold circuits 8–11 transmit the signal "0", i.e., the inverter 31 applies the signal "1" to the other input of the AND gate 30 whereby the output of this gate transmits a signal to the input of the associated matrix 33. The reason for the failure of circuits 8–11 to transmit a signal with a potential "1" is that the intensity of the signal E does not match the preselected threshold values for the circuits 8–11. The OR gate 32 transmits the signal "0" but the inverter 31 applies to the AND gate 30 a signal "1" which causes the gate 30 to transmit a signal to the associated matrix 33. Two of the four outputs of the matrix 33 transmit signals to the inputs R and B of the vidicon tube 18 (note FIG. 1a) so that the corresponding point of the object 1 is reproduced in purple.

Even though the outputs c of the threshold circuits 13, 14 and 15 transmit signals in response to relatively low values of the signal E which is applied to their input b, the corresponding matrices 37, 41 and 45 are not energized when the matrix 33 transmits signals to the inputs R and B of the vidicon tube 18. This is due to the fact that one input of the OR gate 36 receives a signal ("1") from the output of the AND gate 30 so that the signal at the output of the OR gate 36 equals one. Consequently, the inverter 35 transmits a zero signal to the corresponding input of the AND gate 34, i.e., the output of the AND gate 34 does not transmit a signal to the input of the matrix 37. Since the signal "1" is also transmitted from the output of the OR gate 36 to the corresponding inputs of the OR gates 40 and 44, the inverters 39 and 43 ensure that the AND gates 38 and 42 cannot transmit signals to the associated matrices 41 and 45 as long as the signal at the output of the AND gate 30 energizes the matrix 33.

It will be noted that each signal E can cause only one of the eight matrices 17, 21, 25, 29, 33, 37, 41 and 45 to cause the vidicon tube 18 to furnish a visible representation of the corresponding point of the object 1 in a given color. Otherwise stated, each and every point of the object 1 is depicted in a single color which is indicative of its temperature. If the temperature increases, the color changes in a direction from black toward white. As mentioned above, the color scale can be shifted to embrace different temperature ranges by appropriate adjustment of the signal comparing stage 16.

The manner in which the E color matrix 25, 29, 37, 41 or 45 can transmit signals to the vidicon tube 18 is analogous to the aforedescribed manner of supplying the tube 18 with signals from the matrix 17, 21 or 33. The intensity of the signal E determines which of the eight color matrices will transmit signals to the vidicon tube 18.

An important advantage of the improved apparatus is that the components of the means 2, 3, 4' for optically transmitting a thermal image of the object 1 to the detector 5 need not contact the object so that they cannot affect the distribution of temperatures in various regions or zones of the object. Moreover, the adjustable stage 16 renders it possible to shift the range of temperatures which are to be considered, i.e., to shift that temperature or that group of similar temperatures which causes the corresponding threshold circuit 8, 9, 10, 11, 12, 13, 14 or 15 to transmit a signal to the corresponding color matrix. The design of the matrices 17, 21, etc. forms no part of the invention; such matrices are well known in the art. The same holds true for the vidicon tube 18.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An electrothermographic apparatus for detecting and pinpointing abnormalities in humans, especially cancerous growths in the mamma, comprising:
    (a) detector means including a row of pyroelectric detector elements, said detector means further including a self-scanning circuit and a shift register arrangement;
    (b) transmitting means for line-by-line transmission of a thermal image of a region under examination to said row of detector elements, said detector means being operative to cause the generation of signals which correspond to different points of the thermal image and have intensities denoting the temperatures of the respective points;
    (c) storing means for storing the signals from said detector means;
    (d) evaluating means for evaluation of the stored signals according to intensity; and
    (e) displaying means for displaying the evaluated signals in different colors each of which is indicative of a given range of intensities.

2. The apparatus of claim 1, wherein said transmitting means includes means for transmitting to said detector means signals denoting the temperature of each of a number of spots in each scanned line of the image.

3. The apparatus of claim 1, wherein the stored signals are electric voltage signals.

4. The apparatus of claim 1, wherein said detector means is sensitive to infrared radiation.

5. The apparatus of claim 1, wherein said transmitting means comprises an optical band pass filter which transmits elements of the thermal image within a given temperature range.

6. The apparatus of claim 5, wherein the temperature range corresponds to that of the radiation frequency of a human body.

7. The apparatus of claim 1, wherein said transmitting means includes a pivotable mirror.

8. The apparatus of claim 1, wherein said storing means includes means for storing analog signals.

9. The apparatus of claim 1, wherein said storing means includes means for storing digital signals.

10. The apparatus of claim 1, wherein said storing means includes an output for the stored signals and said evaluating means includes a plurality of threshold circuits each connected with said output of said storing means and each having output means arranged to transmit a signal denoting a predetermined color when the intensity of the signal at said output of said storing means is within a range which is selected for such threshold circuit.

11. The apparatus of claim 10, further comprising an adjustable signal comparing stage having an output connected with said threshold circuits, each of said threshold circuits having a first input connected with said output of said storing means and a second input connected with said output of said stage.

12. The apparatus of claim 10, wherein said evaluating means further comprises a color matrix for each of said threshold circuits, the output means of each of said threshold circuits being connected with the corresponding matrices and said matrices having outputs connected with said displaying means.

13. The apparatus of claim 12, wherein said displaying means comprises a vidicon having several color signal inputs and a color density input, said inputs of said vidicon being connected with the outputs of each of said matrices.

14. The apparatus of claim 12, further comprising logic circuits interposed between said threshold circuits and said matrices and arranged to permit only one of said matrices to transmit signals to said displaying means at any stage of imaging of the region under examination.

15. The apparatus of claim 14, wherein said logic circuits include AND gates interposed between the output means of at least some of said threshold circuits and the corresponding matrices and OR gates interposed between the outputs of at least some AND gates and the inputs of neighboring AND gates.

16. The apparatus of claim 15, wherein said threshold circuits form a series of threshold circuits and said logic circuits further include inverters interposed between the OR-gates receiving signals from the output means of the preceding threshold circuits of said series and the inputs of AND gates connected with the output means of the next-following threshold circuits of said series.

17. The apparatus of claim 1, wherein said transmitting means comprises an optical system.

18. The apparatus of claim 17, wherein said optical system comprises a reflector.

* * * * *